United States Patent [19]

Davis

[11] Patent Number: 5,139,576
[45] Date of Patent: Aug. 18, 1992

[54] METHOD AND A HORIZONTAL PIPELINE PIG LAUNCHING MECHANISM FOR SEQUENTIALLY LAUNCHING PIPELINE PIGS

[75] Inventor: Gary W. Davis, Broomfield, Colo.

[73] Assignee: Western Gas Processors, Ltd., Denver, Colo.

[21] Appl. No.: 665,972

[22] Filed: Mar. 7, 1991

[51] Int. Cl.$^5$ .............................................. B08B 9/04
[52] U.S. Cl. ........................................ 134/8; 134/18; 15/104.062; 15/3.5
[58] Field of Search ............... 134/8, 18, 22.11, 22.12; 15/104.062, 3.5, 3.51

[56] References Cited

U.S. PATENT DOCUMENTS

| | | | |
|---|---|---|---|
| 2,915,422 | 12/1959 | Stone | 134/8 |
| 3,169,263 | 2/1965 | Eagleton | 15/104.062 |
| 3,266,076 | 8/1966 | Surber | 15/104.062 |
| 3,384,512 | 5/1968 | Frederick et al. | 134/8 |
| 3,779,270 | 12/1973 | Davis | 15/104.062 |
| 4,135,949 | 1/1979 | Reese | 15/104.062 |
| 4,457,037 | 7/1984 | Rylander | 15/104.062 |

Primary Examiner—Theodore Morris
Assistant Examiner—Saeed Chaudhry
Attorney, Agent, or Firm—James L. Jackson

[57] ABSTRACT

A method and apparatus for sequential launching a plurality of pipeline pigs in serial manner into a gas transmission pipeline. The pig launching system incorporates a tubular magazine for receiving a plurality of pigs and having a free piston movably disposed therein. A source of hydraulic fluid medium is provided and is injected into the magazine behind the free piston for movement of the free piston and the pigs for pig launching. A gas energized liquid pump is operated by gas pressure from the gas transmission pipeline under the control of a timer operated gas supply valve for selective introduction of hydraulic fluid medium into the magazine. A control panel incorporating control circuitry is programmable to achieve timed launching of the pigs into the pipeline and shuts down the pig launching mechanism after each pig has been launched. The control circuitry is also capable of rendering an alarm signal if pig launching is not achieved within a predetermined time period.

17 Claims, 1 Drawing Sheet

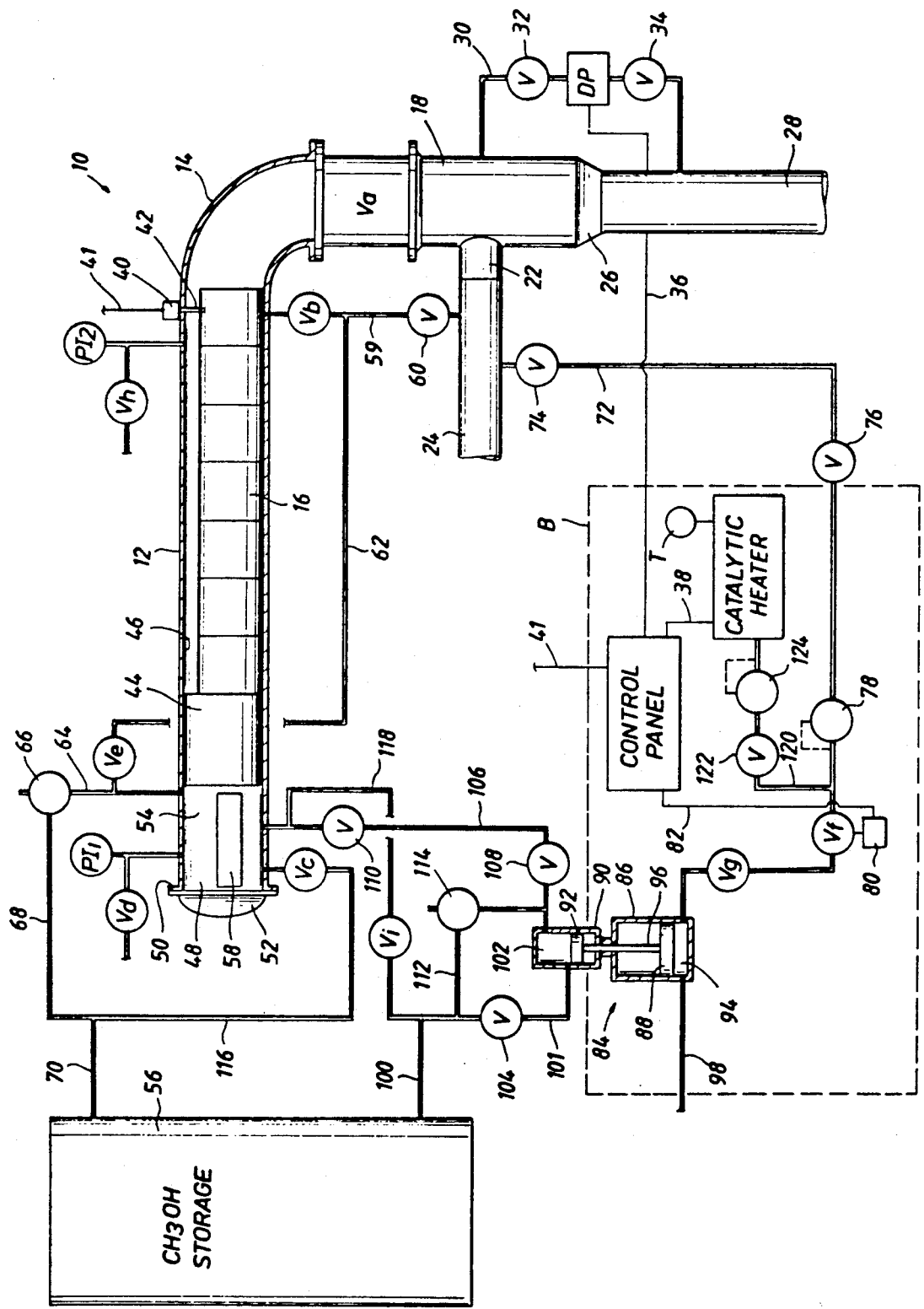

METHOD AND A HORIZONTAL PIPELINE PIG LAUNCHING MECHANISM FOR SEQUENTIALLY LAUNCHING PIPELINE PIGS

FIELD OF THE INVENTION

This invention relates generally to apparatus for introducing pigs into pipelines for the purpose of cleaning such pipelines of debris such as sediment and for clearing the pipeline of fluid such as water, distillate, etc. which may become trapped in low lying areas of the pipeline. More specifically, the present invention relates to an automatic horizontally disposed cup pig launcher which functions sequentially according to the control of a timer mechanism for automatic launching of cup pigs from a pig storage magazine into a gas pipeline and which utilizes a liquid composition which is driven by a gas energized positive displacement pump having gas pressure from the pipeline as its driving fluid medium.

BACKGROUND OF THE INVENTION

In the operation of gas pipelines water and hydrocarbon vapors tend to condense especially during pressure changes across the valves, orifice fittings, pumps, etc. thereby causing the build-up of liquid deposits in the pipeline. These liquid deposits tend to become entrapped in low places in the pipeline and otherwise reduce the cross-section of dimension of the pipeline passages so that unless regularly cleaned of such deposits, the production capacity of the pipeline will be reduced.

Large transportation lines for natural gas are frequently cleaned of condensate, sediment and other debris that might be present in the gas, such cleaning being accomplished by various types of cleaning devices, typically referred to as "pigs" which are passed through the pipeline along with the flowing gas. Various types of pigs such as spheres, line scrapers, bullets, cup pigs, etc. are forced through the pipelines at frequent intervals for the purpose of forcing liquid matter through the pipeline along with the flowing gaseous medium. In some cases, high pressure pipelines transporting fluid material are required to carry a liquid phase simultaneously with the gaseous phase. Such liquids may be present in the gas when it is injected into the pipeline as in full well stream transport or liquids such as drip gasoline or crude oil may be injected into a flowing gas stream to be transported along with the gas.

Where liquid constituents are present in a gas pipeline especially where several different liquids may be transported along with the flowing gas, it will be appropriate to utilize pigs, such as cup pigs, for the purpose of separating the liquids. Accordingly, it is desirable to provide a pig launching mechanism having the capability of sequentially launching a plurality of pigs such as cup pigs into a continuously flowing gas pipeline so that the pipeline will remain clear of any accumulations of sediment, condensate, and so that liquid constituents being transported by the pipelines can remain separated.

SUMMARY OF THE INVENTION

It is a principle feature of the present invention to provide a novel system for sequential launching of cup pigs into a continuously flowing pipeline.

It is also a feature of this invention to provide novel plurality of pigs into a continuously flowing pipeline according a timed sequence.

It is an even further feature of this invention to provide a novel pig launching system which is of automatically actuatable nature and employs gas pressure from the pipeline to provide the motive force for pig launching operations.

It is an even further feature of this invention to provide a novel horizontal cup pig launcher which utilizes a liquid constituent which is compatible with the gas and liquid being handled by the pipeline and which achieves sequential launching of the pigs into the pipeline It is another feature of this invention to provide a novel pig launching mechanism which employs gas pressure from the pipeline for driving a pump, which pump in turn drives a liquid constituent that functions hydraulically to achieve sequential launching of the pigs from a pig storage magazine Briefly, a horizontal automatic cup pig launcher constructed in accordance with the present invention incorporates a pig storage magazine which is typically horizontally disposed and which is in communication with a gas transmission pipeline by means of a launching valve. A plurality of cup pigs are positioned within the magazine and a piston which is driven by a liquid constituent such as methanol ($CH_3OH$) is driven by a pump to impart motive force to the launching piston. The pump for energizing the piston driving liquid constituent is energized by gas pressure from the pipeline and achieves a piston driving liquid pressure that is greater than the gas pressure of the pipeline. A control system is employed to achieve sequential launching of the pigs into the gas transmission pipeline according to a timing sequence which may be varied to suit the needs of those in charge of the pipeline. For example, the timer is programmable to launch from two to six pigs in a twenty-four hour period without necessitating the presence of personnel at the pig launching facility and without requiring (but allowing) remotely controlled actuation of the pig launcher.

Within the scope of the present invention is a method or process for utilization of pipeline gas pressure for developing hydraulic pig launching pressure The method also employs a timer, incorporated within a control panel, which establishes the timing sequence for achieving sequential pig launching. Also, the present invention incorporates the method or process for insuring the safety of the pig storage magazine and for opening and reloading the magazine with additional pigs for subsequent launching thereof and for rendering the launching magazine operational.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments In the Drawings The single FIGURE of the drawings is a partially schematic illustration of an automatic cup pig launching mechanism representing the preferred embodiment of the invention and including pneumatic and hydraulic circuitry for operation of the pig launching mechanism.

DETAILED DESCRIPTION OF PREFERRED

Referring now to the drawing, a horizontal automatic cup pig launcher according to the present invention is illustrated generally at 10 and includes a pig storage magazine 12 which is typically horizontally oriented but which may assume any other suitable position without departing from the spirit and scope of this invention. The tubular magazine 12 is coupled by means of a 90° elbow 14 with a launching valve $V_a$ which may be a gate valve, ball valve or a valve of any other suitable character having a straight through flow passage of sufficient dimension to allow cup pigs 16 to pass therethrough to a launching barrel 18. The launching barrel has its inlet 22 coupled with the incoming pipeline section 24 and its outlet coupled by a reducer 26 to the downstream pipeline section 28.

For the purpose of detecting actual launching of a pig into the downstream pipeline section 28, a conduit 30 has one end thereof coupled with the launching barrel 18 and the opposite end coupled with the downstream flow conduit 28. A differential pressure sensor DP is coupled into the conduit 30 for sensing pressure of both the launching valve and the downstream pipeline. The differential pressure sensor may be selectively isolated from pipeline pressure by isolation valves 32 and 34. The differential pressure sensor DP is coupled by an electrical signal output conductor 36 to the electrical control circuitry of a control panel. To protect the control panel from inclement weather conditions, the control panel and other components of the pig launching mechanism are enclosed within a small building such as shown in broken lines at B. The building B is provided with a catalytic heater which is capable of being automatically energized under the control of the circuitry of the control panel, which is transmitted via electric conductor 38, and in response to internal building temperature being sensed by a temperature sensor T.

The cup pigs 16 within the magazine 12 will be sequentially launched through the elbow 14 and launching valve VA into the launching barrel 18 in accordance with a launching sequence that is determined by the programmable solid state electronic circuitry of the control panel. Sequential and serial launching of the pigs 16 is also accomplished through the use of gas pressure from the pipeline as will be explained in detail hereinbelow. The launching magazine is provided with a pig restraint and release mechanism 40 which provides additional resistance to the forward movement of the pigs 16 preventing multiple launches and prevents launching of the piston 44 In order to accomplish movement of the pigs 16 toward the respective launching positions thereof, a free piston 44 is positioned within the magazine 12 and is provided with appropriate seals for sealing relation thereof with the cylindrical internal surface 46 of the magazine. The free piston 44 engages the last of the serially oriented pigs 16 and is responsive to hydraulic pressure for applying sufficient force to the pigs to move them toward the respective launching positions thereof.

The magazine 12 defines a pig loading opening 48 which is surrounded by a closure support flange 50. A closure mechanism 52 is receivable in sealed relation by the flange 50 and is movable from the closed and sealed position shown in the figure to an open position to permit loading of the pigs into the magazine 12. Preferably, the closure 52 is supported from the magazine by a hinge and is capable of being manually pivoted to its open position after being unlocked from its closed and sealed position.

The free piston cooperates with the loading end of the magazine 12 to define a hydraulic chamber 54 which is adapted by appropriate piping to receive a hydraulic fluid medium from a hydraulic storage facility 56 It is desirable to limit movement of the free piston 44 to the left or toward the loading opening of the magazine. Accordingly, a piston stop element 58 is positioned within the hydraulic chamber 54 and functions as a physical stop which is engaged by the free piston 44 at the limit of piston movement. Thus, both the free piston and the piston stop cooperate to form the hydraulic chamber 54 within the elongate tube of the magazine. If desired, the piston stop 58 may be a freely movable element which is positioned within the hydraulic chamber 54, or in the alternative, the piston stop may be a structural component of the closure 52. In either case, however, its purpose is to limit movement of the free piston 44 toward the loading opening 48 of the magazine Even though the magazine defines an internal cylindrical surface, the piston stop will permit the hydraulic chamber 54 to retain at least a minimum volume of hydraulic fluid. At the launching end of the magazine 12 the pig launch control apparatus 40–42 will stop movement of the piston 44 toward the launch position after the last pig 16 has been launched The free piston will always remain in the magazine except during the pig loading procedure.

After the magazine 12 has been loaded with pigs 16, the piston pig 44 and the piston stop member 58, which activities are accomplished with the launching valve $V_a$ in its closed position, it will be appropriate to balance the pressure of the magazine with pipeline pressure and to balance pressure across the free piston 44 within the magazine. To accomplish these features, a conduit 59 communicates with the pipeline section 24 upstream of the launching barrel 18 and is provided with an isolation valve 60. The conduit 59 is provided to communicate gas pressure from the pipeline into the magazine 12 ahead or upstream of the free piston 44 under the control of a valve $V_b$. A conduit 62 coupled with conduit 59 conducts pipeline pressure to another conduit 64 which is in communication with the hydraulic chamber 54. A valve $V_e$ in conduit 62 controls admission of pipeline pressure from the conduit 62 into the hydraulic chamber. When valves $V_b$ and $V_e$ are open, pipeline pressure is communicated into the magazine 12 and to both the upstream and downstream sides of the piston 44. Thus, the free piston 44 is pressure balanced when these valves are both open. The conduit 64 is provided with an over-pressure control device 66 such as a pressure regulator. A conduit 68 from the pressure regulator 66 is coupled with a conduit 70 leading to the storage vessel 56 for a quantity of hydraulic fluid such as methanol (methyl alcohol). The liquid storage vessel therefore achieves its pressurization from the gas energy of the pipeline. The pressure regulator maintains the storage vessel at a desired pressure to assist in the flow of liquid from the storage vessel to the hydraulic chamber 54 as will be discussed hereinbelow. Storage vessel pressure, however, is insufficient to achieve movement of the free piston within the magazine.

As mentioned above, pressure from the pipeline is utilized to provide the motive force for pressurized transfer of the hydraulic fluid medium from the storage vessel 56 to the hydraulic chamber 54 of the magazine. To accomplish this feature a conduit 72 is coupled with the pipeline section 24 upstream of the launching barrel 18 and includes isolation valves 74 and 76 for selectively controlling communication of pipeline pressure for liquid pumping activity. The conduit 72 also includes an over-pressure control mechanism 78 such as a pressure regulator. Downstream of the pressure regulator is provided a timer controlled gas supply valve $V_f$ which may, for example, be controlled by a solenoid 80 that is energized by the circuitry of the control panel via an electrical conductor 82. A pump safety valve $V_g$ is also provided in the conduit 72 downstream of the pressure regulator 78 and the gas supply valve $V_f$ to insure initial opening of valve $V_f$ and to initiate start of the timing sequence for pig launching.

The pump 84 incorporates a large cylinder 86 having a piston 88 movably disposed therein. A cylinder 90 of smaller dimension as compared to the cylinder 86 is provided with an internally movable piston 92 which is of smaller dimension as compared to the piston 88. Regulated pressure from the conduit 72 enters the piston chamber 94 and acts upon the exposed surface area of the piston 88, thus developing a piston force that is transmitted via an actuator stem 96 to the smaller piston 92 thus driving the liquid pressurizing piston 92 for its power stroke within the cylinder 90. Upon movement of the interconnected pistons 88 and 92 in the opposite direction by pressure introduced into the cylinder 86 above the piston 88, gas within the piston chamber 94 is vented through vent line 98 under control of a check valve or some other suitable control mechanism, not shown and the piston 92 will draw additional liquid into the pumping chamber into the cylinder 90 via suction line 101.

The hydraulic fluid medium is transferred via its gas pressure and its liquid head pressure through a suction conduit 101 to the pump chamber 102 through an isolation valve 104. Upon pressurization by the piston 92, liquid within the pump chamber 102 is forced through a pump discharge conduit 106 to the hydraulic chamber 54 through open isolation valves 108 and 110. To insure that pump discharge pressure does not exceed a predetermined value, a return conduit 112 is coupled with the supply conduit 100 and discharge conduit 106 of the pump cylinder 90 and an over-pressure control mechanism such as a pressure regulator 114 is provided to vent any excessive pressure from the pump discharge conduit 106 back to the storage vessel 56.

In order to facilitate the loading of pigs 16 into the magazine 12 after all of the pigs have been launched, it will be appropriate to return the hydraulic fluid medium from the hydraulic chamber 54 to the storage vessel 56. For this purpose, a return conduit 116 is provided having a control valve $V_c$ located therein. Additionally, a return conduit 118 is provided which is coupled with conduit 106 between the isolation valve 110 and the hydraulic chamber 54. The conduit 118 is controlled by a valve $V_i$ and is in communication with conduit 100. Consequently, when valve $V_i$ is opened, the hydraulic fluid medium within the chamber 54 may be returned through conduits 118 and 100 to the storage facility 56. Likewise, when the valve $V_c$ is opened the hydraulic fluid medium will be returned from the chamber 54 through the conduits 116 and 70 to the storage chamber 56.

As mentioned above, the building or enclosure B is provided with a catalytic heater for the purpose of maintaining the building at a sufficiently high temperature even during extremely cold conditions that the electronic circuitry of the control panel will remain at its proper operational efficiency at all times. The catalytic heater is designed to utilize natural gas from the pipeline for its operation. A supply conduit 120 is provided having an isolation valve 122 and a pressure regulator 124 for supplying natural gas to the catalytic heater at a pressure range that is optimum for heater operation. Under the control of the circuit 38 the control panel will automatically operate the catalytic heater in response to signals from the temperature sensor T.

OPERATION

Pig Loading Procedure

The procedure for achieving loading of a plurality of pigs into the magazine 12 basically comprises 16 steps or activities which require various valve positions and various positions of the closure 52. These steps or activities can be visualized quite readily by inspection of the various valve and closure positions as set forth in the following chart:

| VALUE | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| $V_a$ | O | O | C | C | C | C | C | C | C | C | C | C | C | C | C | O | O |
| $V_b$ | C | C | C | C | C | C | C | C | C | C | C | C | C | O | C | C | C |
| $V_c$ | C | C | C | O | O | C | C | C | C | C | C | C | C | C | C | C | C |
| $V_d$ | C | C | C | C | C | O | O | O | O | O | O | O | C | C | C | C | C |
| $V_e$ | C | C | C | C | O | C | C | C | C | C | C | C | C | C | C | C | C |
| $V_f$ | A | A | A | A | A | A | A | A | A | A | A | A | A | A | A | A | A |
| $V_g$ | O | C | C | C | C | C | C | C | C | C | C | C | C | C | C | C | O |
| $V_h$ | C | C | C | C | C | C | O | O | O | O | O | O | C | C | C | C | C |
| $V_i$ | C | C | C | C | C | C | C | C | C | C | C | O | C | C | C | C | C |
| Closure | C | C | C | C | C | O | O | O | O | O | C | C | C | C | C | C |

Across the top of the chart are identified 16 different activities. Downwardly along the left side of the chart each of the valves is identified, its position being indicated by the letters "C" (closed), "O" (open) and "A" (automatically controlled). The positions of the closure element 52, i.e., opened or closed are indicated at each of the steps according to the chart.

Step 1—To initiate the pig loading procedure the pump safety valve $V_g$ is closed to insure that the gas energized hydraulic pump 84 can not start its operation. In this regard, it should be born in mind that operation of the pump 84 will begin automatically upon the supply of pressurized gas therethrough upon opening of the valve $V_f$. Valve $V_f$ opens responsive to opening of the pump safety valve $V_g$ and is closed in response to timed actuation according to the programming of the control panel circuitry. The valve $V_f$ is also capable of closure by the control panel circuitry if failure of pig launching occurs.

Step 2—It should be born in mind that at the beginning of a pig loading procedure the magazine 12 will be under line pressure from the pipeline because the launching valve $V_a$ will be open. To isolate the magazine 12 from pipeline pressure the launching valve $V_a$ will be closed. After the launching valve has closed the magazine 12 will remain under line pressure until its pressure is bled to the atmosphere or otherwise to a designated receptacle. The magazine pressure on each side of the free piston 44 may be visually observed through inspection of pressure indicators $PI_1$ and $PI_2$.

Step 3—It will be appropriate to shift the free piston 44 towards the closure 52 to thus permit the piston stop 58 and the free piston to be removed from the magazine. This is accomplished by slowly opening the valve $V_c$ which allows gas pressure within the magazine to move the free piston 44 to the left toward the piston stop 58 while the hydraulic fluid medium is being bled through valve $V_c$ and conduits 116 and 70 to the storage vessel 56. This activity will be continued until the free piston has come into contact with the piston stop 58. At this point, it will be observed that a quantity of the hydraulic fluid medium will remain within the chamber 54 and the magazine 12 will remain under gas pressure though the pressure will have been reduced somewhat by virtue of piston movement by the expanding gas.

Step 4—In order to transfer the remaining hydraulic fluid medium from the chamber 54 to the storage vessel 56 valve $V_e$ will be slowly opened, thereby allowing gas pressure from the pipeline flowing through valve 60 conduits 59 and 62 and valve $V_e$ to develop a positive gas pressure within the chamber 54. In order to prevent the free piston 44 from being moved to the right as the injected gas pressure is displacing the hydraulic fluid medium from the chamber 54 through conduit 116 and 70 through the open valve $V_c$, it is important to insure that the pressure detected by pressure indicator $PI_1$ does not exceed the pressure detected by pressure indicator $PI_2$. This insures that piston movement in the opposite direction does occur as the hydraulic chamber is being cleared of liquid. As soon as the introduction of gas pressure from the chamber 54 through conduits 116 and 70 is detected, all of the hydraulic fluid medium will have been displaced from the chamber 54. At this point, valve $V_e$ is closed to prevent any further introduction of gas pressure into the chamber 54.

Step 5—At this point, it must be insured that valves $V_a$, $V_b$, $V_c$ and $V_e$ are closed to insure that the magazine 12 is isolated from fluid pressure from any source. The vent valve $V_d$ is then slowly opened to vent the pressure from chamber 54 to the atmosphere. At this point there will be pressure present in the magazine 12 between the free piston 44 and the closed launching valve $V_a$. This pressure will maintain free piston in contact with the piston stop 58. Next, the vent valve $V_h$ is opened, thereby venting pressure from the magazine 12 to the atmosphere After this has been accomplished, the pressure on each side of the free piston 44 will be atmospheric pressure. The pressure indicators $PI_1$ and $PI_2$ should be at 0 or atmospheric pressure and both the vent valves $V_d$ and $V_h$ should be open.

Step 6—After operation personnel has made absolutely certain that no gas pressure is present within the magazine 12 on either side of the free piston 44, the closure member 52 is unlocked and opened.

Step 7—The piston stop 58 and the free piston 44 are then removed from the magazine. It should be born in mind, that if piston stop 58 is in assembly with the closure, opening of the closure will also accomplish removal of the piston stop.

Step 8—The appropriate number of pipeline pigs are then inserted into the magazine. Typically, the magazine will be filled with six or seven cup pigs but it should be born in mind that such is not limiting as to the spirit and scope of this invention. The magazine may be of any suitable length and thus the pigs 16 may be of any suitable number.

Step 9—After the magazine has been appropriately loaded with pipeline pigs, the piston pig and the pig stop are then inserted into the magazine.

Step 10—The closure member 52 is then properly positioned with respect to the flange 50 at the opening 48 of the magazine and is properly locked and sealed.

Step 11—The hydraulic fluid supply valve $V_i$ is then opened and allowed to remain open until hydraulic fluid is detected to be present at the open vent valve $V_d$ thus indicating that the chamber 54 will have been completely filled with the hydraulic fluid medium. Filling of the chamber 54 could be accomplished solely due to the head pressure of the hydraulic pressure within the storage vessel 56. More practically, however, gas pressure is introduced into the storage vessel 56 through conduits 59, 62, 64, 68 and 70 by opening of valve $V_e$. The pressure regulator 66 will control the gas pressure condition within the storage vessel. The various isolation valves throughout the conduit system will remain open unless isolation of specific components of the system is desired such as for servicing, repair or replacement. Only the control valves $V_a$–$V_i$ will be opened or closed to control operation of the pig launching system.

Step 12—The magazine pressure supply valve $V_b$ is slowly opened to introduce pressure from the pipeline 24 into the magazine between the closed launching valve $V_a$ and the free piston 44. After a time, the magazine will reach pipeline pressure.

Step 13—The magazine pressure supply valve $V_b$ is then closed to render the magazine 12 to appropriate conditions for subsequent operations and to isolate the magazine from pipeline pressure except through the launching valve $V_a$.

Step 14—The launching valve $V_a$ is then moved to its open position, such movement being relatively easy because, though under line pressure, no pressure differential will exist across the launching valve.

Step 15—The pump safety valve $V_g$ is then opened to permit initiation of sequential timer opening of the control valve $V_f$ for operation of the gas driven pump 84.

Pig Launching Procedure

The circuitry of the control panel is programmed, as mentioned above to launch from two to six pigs from the magazine into the pipeline during each 24 hour period. The control timer of the control panel initiates its start sequence by opening the control valve $V_f$ thereby allowing gas pressure from the pipeline under the control of pressure regulator 78 to pass through the open pump safety valve $V_g$ into the piston chamber 94 of the large cylinder 86. The pump pistons will then begin to reciprocate, drawing hydraulic fluid from the supply conduit 100 into the piston chamber 102 during each suction stroke and discharging pressurized hydraulic fluid from the chamber 102 into the discharge conduit 106 during each power stroke of the piston 92.

Thus the hydraulic fluid (methanol) is forced into the chamber 54 of the magazine, thereby developing a pressure differential across the free piston 44 which develops sufficient force to urge the free piston and the pigs 16 in the direction of launching. The first of the serially arranged pigs 16 is restrained by element 42 until sufficient pressure is developed in the chamber 54 to advance a pig past the stop. When this occurs, the first pig will be forced to the right and will slide under the influence of gravity through the passage of the elbow 14 and through the open launching valve $V_a$ into the launching barrel 18. The flow of fluid from the pipelines through the launching barrel will then force the piston into the pipeline section 28 so that the pig will be forced through the pipeline by the flowing fluid. Any condensate, sediment or other material which is present within the pipeline will be forced by the pig through the pipeline until the pig is caught by a pig trap at the terminus of its movement.

The control panel circuitry is capable of detecting actual launching of each pig. The differential pressure detector DP with its isolation valves 32 and 34 open will detect internal pressure fluctuations as the pig is launched into the pipeline section 28. For example, when a 10 pound differential pressure signal occurs at the differential pressure switch DP an electrical signal will be conducted via the conductor 36 to the control panel circuitry. This signal will cause the control panel circuitry to close the valve $V_f$, thereby stopping the supply of gas to the pump mechanism 84 and thereby ceasing pig movement by the free piston 44 within the magazine 12. Simultaneously with closing of the valve $V_f$ a signal is transmitted indicating that a pig has been launched through the launching barrel, thus restarting the timing sequence for subsequent pig launching.

The pig launching mechanism is also provided with a system to discontinue the pig launching procedure in the event a malfunction occurs. For example, the timer control valve $V_f$ is provided with a timer limiting feature. In the event an appropriate differential pressure signal is not detected by the differential pressure sensor DP within a preselected period of time such as 10 minutes of the opening of the valve $V_f$ by the timer of the control panel, the timer will automatically signal the valve $V_f$ to close even though pig launching has not been detected and to render and alarm signal so that the malfunction is immediately reported. This timer protection control is variable to suit the needs of the user. For example, automatic closure of the valve $V_f$ by the timer may be varied between five minutes to 20 minutes to insure that the launching mechanism has adequate time to achieve positive launching of each pig.

Automatic operation of the pig launching mechanism will then continue until such time as the last pig has been launched and its launching has been properly detected. After launching of the last pig, the valve $V_f$ will be closed by the circuitry of the control panel and the pig launching mechanism will then remain inoperative until the magazine is subsequently reloaded with pigs according to the loading procedure described above.

The hydraulic fluid medium that is contained within the storage vessel 56 and is utilized for the pig launching procedure may take any suitable liquid form that is compatible with the fluid being controlled by the pipeline. For example, one suitable fluid that is acceptable for use as hydraulic fluid in connection with the transportation of natural gas and the liquids that are normally associated therewith, may conveniently take the form of methanol, CH3OH, also described as methyl alcohol. Other suitable liquids that are capable of being utilized in conjunction with pipelines handling petroleum products such as natural gas are diesel oil, jet fuel, kerosene, etc.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A method for timed automatic sequential launching of serially oriented pipeline pigs from a pig launching system having a tubular pig storage and launching magazine into a gas transmission pipeline, comprising:
   (a) providing a source of hydraulic fluid medium;
   (b) locating a free piston within said tubular pig storage and launching magazine for motive contact with the last of said serially oriented pipeline pigs, said free piston partitioning said tubular pig storage and launching magazine into a hydraulic chamber and a pig storage chamber having a launching opening for communication with said pipeline;
   (c) employing gas pressure from said gas transmission pipeline for pressurizing said hydraulic fluid medium from said source;
   (d) introducing the pressurized hydraulic fluid medium into said hydraulic chamber for hydraulically induced movement of said free piston and said serially oriented pipeline pigs toward said launching opening while restraining launching movement of the first of said serially oriented pipeline pigs;
   (e) controllably releasing said restraining of said first of said serially oriented pipeline pigs from said tubular pig storage and launching magazine for launching movement thereof through said pig launching opening and into said gas transmission pipeline by said free piston acting under motive force developed thereon by said pressurized hydraulic fluid; and
   (f) successively controllably releasing and launching each of said serially oriented pipeline pigs as set forth in paragraph (e) above.

2. The method of claim 1, wherein said pig launching system incorporates a gas energized liquid pump having its suction in communication with said source of hydraulic fluid medium and its discharge in communication with said hydraulic chamber of said tubular pig storage and launching magazine, said method including;
   selectively communicating pressurized gas from said gas transmission pipeline to said gas energized liquid pump for energization thereof, said gas energized liquid pump delivering said hydraulic fluid medium from said source to said hydraulic chamber at a pressure exceeding the pressure of said gas transmission pipeline, thus developing a differential pressure across said free piston for inducing movement of said free piston and said pig toward said launching opening.

3. The method of claim 2 wherein said pig launching system includes a gas control valve for controlling communication of pressurized gas from said gas transmission pipeline to said gas energized liquid pump and further includes a timer control for opening and closing said gas control valve according to a preprogrammed timed sequence, said method including:

selectively opening said gas control valve responsive to signals of said timer control for selective gas energization of said gas energized liquid pump by gas pressure from said gas transmission pipeline thus achieving selective operation of said gas energized liquid pump for selective delivery of pressurized hydraulic fluid medium from said source into said hydraulic chamber.

4. The method of claim 3, including:
(a) detection of pig launching from said launching opening into said gas transmission pipeline and providing an electrical signal to said timer control; and
(b) closing said gas control valve by said timer control responsive to said pig launching signal to thus deenergize said gas energized liquid pump.

5. The method of claim 4, including:
(a) automatically closing said gas control valve after passage of a predetermined period of time in absence of pig launching signal to said timer control; and
(b) rendering an alarm signal indicative of automatic timer controlled gas valve closure to identify failure of pig launching.

6. The method of claim 1, wherein said pig launching system incorporates:
(a) a launching barrel to receive pipeline pigs released from said magazine, said pig launching barrel being connected to and forming part of said gas transmission pipeline; and
(b) a launching valve being positioned between said magazine and said pig launching barrel, and when open, permitting passage of pigs therethrough during launching, said launching valve, when closed, isolating said magazine from the gas pressure of said gas transmission pipeline.

7. The method of claim 1, including:
(a) isolating said magazine from the pressure of said gas transmission pipeline;
(b) loading a quantity of pipeline pigs into said magazine in serial fashion;
(c) placing a free piston into said magazine behind the last of said pipeline pigs;
(d) placing a piston stop within said magazine behind said free piston;
(e) closing and sealing said magazine;
(f) introducing gas pressure from said gas transmission pipeline into said magazine ahead of said free piston to establish a pressure balanced condition across said launching valve;
(g) opening said launching valve;
(h) for serial launching of said pipeline pigs from said magazine into said gas transmission pipeline selectively using gas pressure from said gas transmission pipeline to impart said pressure to said hydraulic fluid medium within said hydraulic chamber for a sufficient period of time for launching a single piston from said magazine into said gas transmission pipeline; and
(i) discontinuing pressurization of said hydraulic fluid medium by said gas pressure from said gas transmission pipeline subsequent to launching each of said pigs from said magazine.

8. The method of claim 7, wherein a gas energized liquid pump is disposed with its liquid suction in communication with said source of hydraulic fluid medium and with its discharge in communication with said hydraulic chamber and a gas supply conduit coupled with said gas transmission pipeline is also coupled in gas supplying driving relation with said gas energized liquid pump and a timer controlled valve is located in said gas supply conduit for selective control of gas supply to said gas energized liquid pump, said method including:
(a) for initiation of pig launching, opening said gas supply valve to initiate pumping of hydraulic fluid medium from said source into said hydraulic chamber at a pressure exceeding gas pressure within said magazine thus moving said free piston and said pigs in the direction of launching; and
(b) upon detection of pig launching from said magazine into said gas transmission pipeline, closing said gas supply valve to cease liquid pump operation and to discontinue introduction of hydraulic fluid medium into said hydraulic chamber.

9. A pipeline pig launching mechanism for sequentially launching pipeline pigs into a gas transmission pipeline, comprising:
(a) a magazine for containing a plurality of pipeline pigs arranged in serial orientation, said magazine having a launching end in communication with said gas transmission pipeline and a loading end forming an access opening;
(b) a closure for selectively opening and closing said access opening permitting loading of pipeline pigs into said magazine;
(c) a free piston being movably disposed within said magazine and having pig moving contact with the last of said plurality of serially oriented pipeline pigs and capable of moving said pipeline pigs toward said launching end of said magazine;
(d) means for releasably restraining launching movement of the first of said pipeline pigs and for preventing launching of said free piston;
(e) means for controllably and sequentially releasing said first of said pipeline pigs for launching movement thereof by said free piston;
(f) a source of hydraulic fluid medium; and
(g) means responsive to gas pressure from said gas transmission pipeline for pressurizing said hydraulic fluid medium from said source and injecting said pressurized hydraulic fluid medium into said magazine behind said free piston at a pressure exceeding the pressure of said gas transmission pipeline to thus apply motive force to said free piston for movement of said plurality of pipeline pigs to said launching end of said magazine for sequential launching of the same into said gas transmission pipeline.

10. The pipeline pig launching mechanism of claim 9, wherein said means for pressurizing said hydraulic fluid medium comprises:
(a) a gas energized liquid pump having its liquid suction in communication with said source of hydraulic fluid medium and having its discharge in communication with said magazine;
(b) a gas supply conduit having one end thereof in communication with said gas transmission pipeline and the opposite end thereof coupled in gas supplying relation with said gas energized liquid pump;
(c) a gas supply valve being coupled in said gas supply conduit and when open, permitting the flow of gas through said conduit to said gas energized liquid pump; and
(d) control means for selectively opening said gas supply valve for launching of one of said pipeline pigs from said magazine into said gas transmission pipeline and closing said gas supply valve upon launching of each of said pipeline pigs.

11. The pipeline pig launching mechanism of claim 10, wherein said control means comprises:
   a control panel having an electrical timing circuit coupled in electrically controlling relation with said control valve and being capable of selectively opening and closing said control valve for selective deviation of said gas energized liquid pump.

12. The pipeline pig launching mechanism of claim 11, including:
   a pump safety valve being coupled within said gas supply conduit downstream of said gas control valve opening of said pump safety valve initiating a timing sequence of said timer circuit of said control panel for initiation of a timed sequence of opening and closing of said gas supply valve.

13. The pipeline pig launching mechanism of claim 12, including:
   (a) means for detecting launching of a pipeline pig from said magazine into said gas transmission pipeline and for providing an electrical signal to said control panel circuitry indicating that pig launching has taken place; and
   (b) said control circuitry of said control panel closing said gas supply valve upon receiving said pig launching signal.

14. The pipeline pig launching mechanism of claim 9, including:
   (a) a launching barrel being coupled in flow conducting relation with said gas transmission pipeline;
   (b) a launching valve being disposed between said launching barrel and said magazine, when open, said launching valve permitting passage of pigs therethrough for launching, when closed, said launching valve isolating said magazine from the gas pressure of said gas transmission pipeline; and
   (c) a differential pressure sensor being coupled between said launching barrel and said gas transmission pipeline and having an electrical conductor coupled with the control circuitry of said control panel, upon detection of a predetermined differential pressure indicating pig launching to said gas transmission pipeline, said differential pressure sensor transmitting a signal through said conductor to said control circuitry.

15. The pipeline pig launching mechanism of claim 9, including:
   (a) a pig stop member being removably positioned within said magazine behind said piston pig to thus limit pressure induced free piston movement toward said closure to thus define a hydraulic chamber between said free piston and said closure; and
   (b) said discharge of said gas energized liquid pump being in communication with said hydraulic chamber.

16. The pipeline pig launching mechanism of claim 15, including:
   (a) a drain conduit being in communication with said hydraulic chamber of said magazine and also being in communication with said source of hydraulic fluid medium; and
   (b) a drain control valve being coupled into said drain conduit and being selectively opened to permit gas energized return of hydraulic fluid medium from said hydraulic chamber to said source of hydraulic fluid medium as said free piston is moved toward said closure by gas pressure within said magazine.

17. The pipeline pig launching mechanism of claim 9, wherein said gas energized liquid pump comprises:
   (a) a double acting piston pump mechanism having opposed gas and liquid cylinders, said liquid cylinder being of smaller dimension as compared to said gas cylinder;
   (b) gas and liquid pistons being movable disposed within said respective gas and liquid cylinders, said pistons being coupled by a piston shaft;
   (c) said liquid cylinder having a suction in communication with said source of hydraulic fluid medium and having a discharge in communication with said hydraulic chamber of said magazine; and
   (d) responsive to the flow of pressurized gas from said gas transmission pipeline, said gas piston reciprocating and driving said liquid piston in sequential reciprocating manner to pump said hydraulic fluid medium from said source to said hydraulic chamber.

* * * * *